(12) United States Patent
Sawai

(10) Patent No.: US 11,377,004 B2
(45) Date of Patent: Jul. 5, 2022

(54) VEHICLE SEAT AND DESIGN METHOD FOR SAME

(71) Applicant: MAZDA MOTOR CORPORATION, Hiroshima (JP)

(72) Inventor: Ryo Sawai, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 385 days.

(21) Appl. No.: 16/633,833

(22) PCT Filed: Jul. 27, 2018

(86) PCT No.: PCT/JP2018/028284
§ 371 (c)(1),
(2) Date: Jan. 24, 2020

(87) PCT Pub. No.: WO2019/022238
PCT Pub. Date: Jan. 31, 2019

(65) Prior Publication Data
US 2020/0398715 A1   Dec. 24, 2020

(30) Foreign Application Priority Data
Jul. 27, 2017   (JP) .............................. JP2017-145340

(51) Int. Cl.
*B60N 2/50*   (2006.01)
*B60N 2/54*   (2006.01)
(Continued)

(52) U.S. Cl.
CPC ............. *B60N 2/504* (2013.01); *B60N 2/509* (2013.01); *B60N 2/54* (2013.01); *B60N 2/7094* (2013.01); *B60N 2/90* (2018.02)

(58) Field of Classification Search
CPC .......... B60N 2/504; B60N 2/509; B60N 2/54; B60N 2/7094; B60N 2/90
(Continued)

(56) References Cited

U.S. PATENT DOCUMENTS 1,886,308 A * 11/1932 Schultes ................ A47C 7/405
297/285
3,565,482 A * 2/1971 Blodee ..................... A47C 7/14
297/284.3
(Continued)

FOREIGN PATENT DOCUMENTS

JP   2015217232 A   12/2015

OTHER PUBLICATIONS

International Search Report issued in PCT/JP2018/028284; dated Oct. 16, 2018.
(Continued)

*Primary Examiner* — Mark R Wendell
(74) *Attorney, Agent, or Firm* — Studebaker & Brackett PC

(57) ABSTRACT

Disclosed is a vehicle seat (1) comprising a seat cushion (2) and a seat back (4), wherein the seat cushion and the seat back are comprised of: a frame structure (8) to be fixed to the vehicle body; and a seating member (10) supported by the frame structure having an elastic deformation property and a vibration damping property and allow an occupant to be seated therein, and wherein the vehicle seat satisfies the following relationship: $D_S/D_F \geq 20$, where $D_S$ denotes a deformation amount of the seating member itself in a situation where a load W is applied at a position $X_S$ of the seating member, and $D_F$ denotes a displacement of a position $X_F$ of the frame structure corresponding to the position $X_S$, in a situation where the frame structure is fixed to the vehicle body, and the given load W is applied at the position $X_F$.

5 Claims, 6 Drawing Sheets

(51) Int. Cl.
*B60N 2/70* (2006.01)
*B60N 2/90* (2018.01)

(58) Field of Classification Search
USPC ........................................................ 267/131
See application file for complete search history.

(56) References Cited

U.S. PATENT DOCUMENTS

| | | | | | |
|---|---|---|---|---|---|
| 3,574,401 | A * | 4/1971 | Lehner | ................... | B60N 2/504 |
| | | | | | 297/308 |
| 3,632,170 | A * | 1/1972 | Witt | ......................... | A47C 7/18 |
| | | | | | 297/440.22 |
| 3,681,797 | A * | 8/1972 | Messner | .............. | A47C 27/144 |
| | | | | | 5/652.2 |
| 3,713,696 | A * | 1/1973 | Dudley | ................... | B60N 2/64 |
| | | | | | 297/452.32 |
| 3,819,232 | A * | 6/1974 | Wagner | ................... | B60N 2/72 |
| | | | | | 297/452.21 |
| 3,833,260 | A * | 9/1974 | Harder, Jr. | ............... | A47C 7/18 |
| | | | | | 297/452.37 |
| 3,861,747 | A * | 1/1975 | Diamond | ................. | B60N 2/68 |
| | | | | | 297/452.49 |
| 3,924,893 | A * | 12/1975 | Ferrara | ................... | B60N 2/686 |
| | | | | | 297/452.47 |
| 4,052,104 | A * | 10/1977 | Noss | ....................... | A47C 7/185 |
| | | | | | 297/452.17 |
| 4,164,356 | A * | 8/1979 | Knight | .................... | A47C 1/028 |
| | | | | | 297/1 |
| 4,176,880 | A * | 12/1979 | Marchello | ................. | B62J 1/00 |
| | | | | | 297/214 |
| 4,383,342 | A * | 5/1983 | Forster | ................... | A47C 7/405 |
| | | | | | 601/134 |
| 4,798,414 | A * | 1/1989 | Hughes | ................ | A61H 1/0292 |
| | | | | | 601/84 |
| 5,226,188 | A * | 7/1993 | Liou | ...................... | A47C 7/742 |
| | | | | | 5/653 |
| 5,700,060 | A * | 12/1997 | Bullard | .................... | A47C 7/34 |
| | | | | | 5/230 |
| 5,816,661 | A * | 10/1998 | Sakurai | .................... | B60N 2/70 |
| | | | | | 297/452.47 |
| 6,082,825 | A * | 7/2000 | Simon | ...................... | A47C 7/35 |
| | | | | | 267/101 |
| 6,164,726 | A * | 12/2000 | Reeves | .................. | A47C 7/024 |
| | | | | | 297/16.2 |
| 6,877,816 | B1 * | 4/2005 | Farmont | .............. | A47C 31/126 |
| | | | | | 297/380 |
| 7,320,503 | B2 * | 1/2008 | Eysing | .................. | B60N 2/914 |
| | | | | | 297/285 |
| 8,262,157 | B2 * | 9/2012 | Novak | ................... | A47C 1/146 |
| | | | | | 297/16.2 |
| 8,454,094 | B1 * | 6/2013 | Boulware, Sr. | .......... | B60N 2/60 |
| | | | | | 5/641 |
| 9,580,000 | B2 * | 2/2017 | Ito | ........................... | B60N 2/68 |
| 2010/0117433 | A1 * | 5/2010 | Cassaday | ............... | A47C 7/746 |
| | | | | | 297/452.46 |
| 2010/0171346 | A1 * | 7/2010 | Laframboise | ......... | B29C 66/742 |
| | | | | | 297/284.6 |
| 2014/0312676 | A1 * | 10/2014 | Ito | ........................... | B60N 2/64 |
| | | | | | 297/452.48 |
| 2016/0144756 | A1 * | 5/2016 | Ito | ........................ | B60N 2/7094 |
| | | | | | 297/452.49 |
| 2017/0086590 | A1 | 3/2017 | Fujita et al. | | |

OTHER PUBLICATIONS

International Preliminary Report on Patentability and Written Opinion issued in PCT/JP2018/028284; dated Jan. 28, 2020.

* cited by examiner

VEHICLE SEAT AND DESIGN METHOD FOR SAME

TECHNICAL FIELD

The present invention relates to a vehicle seat, and particularly to a vehicle seat mountable to a vehicle body of a vehicle and comprising a seat cushion and a seat back, and a design method for the vehicle seat.

BACKGROUND ART

JP 2015-217232A (Patent Document 1) discloses a seat cushion member support mechanism and a seat structure. This seat cushion member support mechanism comprises: a front torsion bar; a front link coupled to the front torsion bar; a rear torsion bar; a rear link coupled to the rear torsion bar, wherein the front link and the rear link are provided such that they are rotated, respectively, in opposite directions when a given value or more of load is applied thereto. The seat cushion member support mechanism further comprises a damper provided between lower portions of the front and rear links, wherein the mechanism is configured such that, when a load of a given level or more is applied thereto, the damper is extended and compressed to generate a damping force, and, in a smaller load fluctuation, a shock is mitigated by elasticity of the front and rear torsion bars, instead of causing the damper to be extended and compressed. The seat cushion member support mechanism described in the Patent Document 1 is configured in the above manner to form a system having a Duffing-type non-linearity, so that it is improved in vibration absorbing property and shock absorbing property.

CITATION LIST

Patent Document

Patent Document 1: JP 2015-217232A

SUMMARY OF INVENTION

Technical Problem

In the field of vehicle seats, various developments have been conducted to improve sitting comfort and riding comfort of a seated occupant. In these conventional research and development activities, a frame structure (seat cushion member support mechanism) and a cushion of a vehicle seat have been improved in terms of properties thereof, separately, as in the invention described in the Patent Document 1. However, even if properties of a frame structure, a cushion and others of a vehicle seat are improved, the improved properties have not necessarily been coincident with riding comfort actually felt by an occupant seated in the vehicle seat. The present inventor has found that even if a frame structure, a cushion and others of a vehicle seat are improved separately, it is difficult to obtain expected or intended riding comfort. That is, the present inventor has found that a vehicle seat is used in a state in which it is mounted to a vehicle body, and therefore it is difficult to achieve, at a high level, all of a feeling of unity between the vehicle seat and the vehicle body, good sitting comfort and good riding comfort to be felt by a seated occupant. More specifically, the present inventor has found that, by setting a given property including a mounting state of a vehicle seat to a vehicle body to fall within a given range, physical properties of the vehicle seat sufficiently reflect on riding comfort to be felt by the occupant.

It is therefore an object of the present invention to provide a vehicle seat capable of, in a state in which it is mounted to a vehicle body of a vehicle, obtaining a feeling of unity between the vehicle seat and the vehicle body, good sitting comfort and good riding comfort.

Solution to Technical Problem

In order to solve the above problem, according to a first aspect of the present invention, there is provided a vehicle seat mountable to a vehicle body of a vehicle and comprising a seat cushion and a seat back, the vehicle seat comprising: a frame structure to be fixed to the vehicle body; and a seating member supported by the frame structure and configured to have a given elastic deformation property and a given vibration damping property and allow an occupant to be seated therein, wherein the vehicle seat satisfies the following relationship: $D_S/D_F \geq 20$, where $D_S$ denotes a deformation amount of the seating member itself in a situation where a given load W is applied at a given position $X_S$ of the seating member, and $D_F$ denotes a displacement amount of a position $X_F$ of the frame structure corresponding to the given position $X_S$, in a situation where the frame structure is fixed to the vehicle body, and the given load W is applied at the position $X_F$.

The present inventor has diligently continued to conduct researches about the reason that an elastic deformation property of a frame structure itself and an elastic deformation property and a vibration damping property of a seating member itself in a seat cushion and a seat back of a vehicle seat are not necessarily linked directly to riding comfort to be felt by an occupant. As a result, the present inventor has found that, when a force is applied to the frame structure of the vehicle seat used in a state in which it is mounted to a vehicle body, the resulting displacement of the frame structure is fairly influenced by a joining structure between the frame structure and the vehicle body, and this influence is not negligible.

Therefore, even if, through researches about the elastic deformation property and the vibration damping property of each of the frame structure itself and the seating member itself, these properties are set to adequate values, properties of a joining area between the frame structure and the vehicle undesirably exert an influence on riding comfort to be felt by an occupant. For the above reason, even if properties of each of the frame structure itself and the seating member itself are adequately set, expected riding comfort could not necessarily be obtained.

In such a situation, the present inventor has found that good riding comfort can be obtained when a given relationship is satisfied between a given property of the frame structure in a state in which it is mounted to a vehicle body of a vehicle and a given property of the seating member itself. Specifically, good riding comfort can be obtained when the following relationship is satisfied: $D_S/D_F \geq 20$, where $D_S$ denotes a deformation amount of the seating member itself in the situation where a given load W is applied at a given position $X_S$ of the seating member, and $D_F$ denotes a displacement amount of a position $X_F$ of the frame structure corresponding to the given position $X_S$, in a situation where the frame structure is fixed to the vehicle body, and the given load W is applied at the position $X_F$. That is, by configuring the vehicle seat to satisfy the above relationship between the deformation amount $D_S$ of the seating member itself and the displacement amount $D_F$ in the state in which the frame structure is fixed to the vehicle body, a displacement between the entire vehicle seat and the vehicle body during behavior such as vehicle acceleration or deceleration is reduced, thereby allowing a seated occupant to more reliably realize a feeling of unity with the vehicle. Further, when the above relationship is satisfied between the deformation amount $D_S$ and the displacement amount $D_F$, a displacement (deformation) of the frame structure becomes less likely to exert a negative influence on the elastic deformation property and the vibration damping property of the seating member itself, so that it is possible to allow the seating member to sufficiently bring out intended performance in a design phase to obtain good riding comfort. For example, by configuring the vehicle seat to satisfy the above relationship between the deformation amount $D_S$ and the displacement amount $D_F$, it is possible to use low rebound urethane foam (shape-memory urethane foam) to enhance an occupant holding capability during behavior of the vehicle.

Preferably, in the vehicle seat of the present invention, the seating member comprises a member made from urethane foam and having a given elastic deformation property and a given vibration damping property, and a spring made from metal and having a given elastic deformation property.

According to this feature, the seating member comprises a member made from urethane foam and having a given elastic deformation property and a given vibration damping property, and a spring made from metal and having a given elastic deformation property. This makes it possible to easily control the elastic deformation property and the vibration damping property of the seating member, and easily obtain desired properties.

Preferably, in the vehicle seat of the present invention, the position $X_F$ at which the load is applied to the frame structure is a position corresponding to a center-of-gravity position of the thorax of the seated occupant, and wherein the frame structure is formed such that a ratio of the load W to the displacement amount $D_F$ in the situation where the load W is applied at the position $X_F$ is 70 N/mm or more.

According to this feature, the frame structure is formed such that the ratio of the load W to the displacement amount $D_F$ at the position corresponding to the center-of-gravity position of the thorax of the occupant is 70 N/mm or more, so that it is possible to sufficiently bring out the elastic deformation property and the vibration damping property of the seating member itself, at the center-of-gravity position of the thorax mainly supporting the upper body of the occupant, without being largely influenced by the displacement of the frame structure. This makes it possible to easily construct a vehicle seat capable of providing good riding comfort.

According to a second aspect of the present invention, there is provided a design method for a vehicle seat mountable to a vehicle body of a vehicle and comprising a seat cushion and a seat back, the vehicle seat comprising: a frame structure to be fixed to the vehicle body; and a seating member supported by the frame structure and configured to have a given elastic deformation property and a given vibration damping property and allow an occupant to be seated therein. The design method comprises the steps of: designing the seating member, and determining, by measurement or calculation, a deformation amount $D_S$ of the designed seating member itself in a situation where a given load W is applied at a given position $X_S$ of the designed seating member; designing the frame structure, and determining, by measurement or calculation, a displacement amount $D_F$ of a position $X_F$ of the designed frame structure corresponding to the given position $X_S$, in a situation where the designed frame structure is fixed to the vehicle body, and the given load W is applied at the position $X_F$; and checking whether or not the deformation amount $D_S$ and the displacement amount $D_F$ satisfy the following relationship: $D_S/D_F \geq 20$, and, if not, modifying the seating member, the frame structure, and/or a mounting structure of the frame structure to the vehicle body, so as to satisfy the relationship: $D_S/D_F \geq 20$.

Effect of Invention

The vehicle seat of the present invention can obtain a feeling of unity between the vehicle seat and the vehicle body, good sitting comfort and good riding comfort, in a state in which the vehicle seat is mounted to the vehicle body.

DESCRIPTION OF EMBODIMENTS

With reference to the accompanying drawings, a vehicle seat according to one preferred embodiment of the present invention will now be described.

Figure 1:
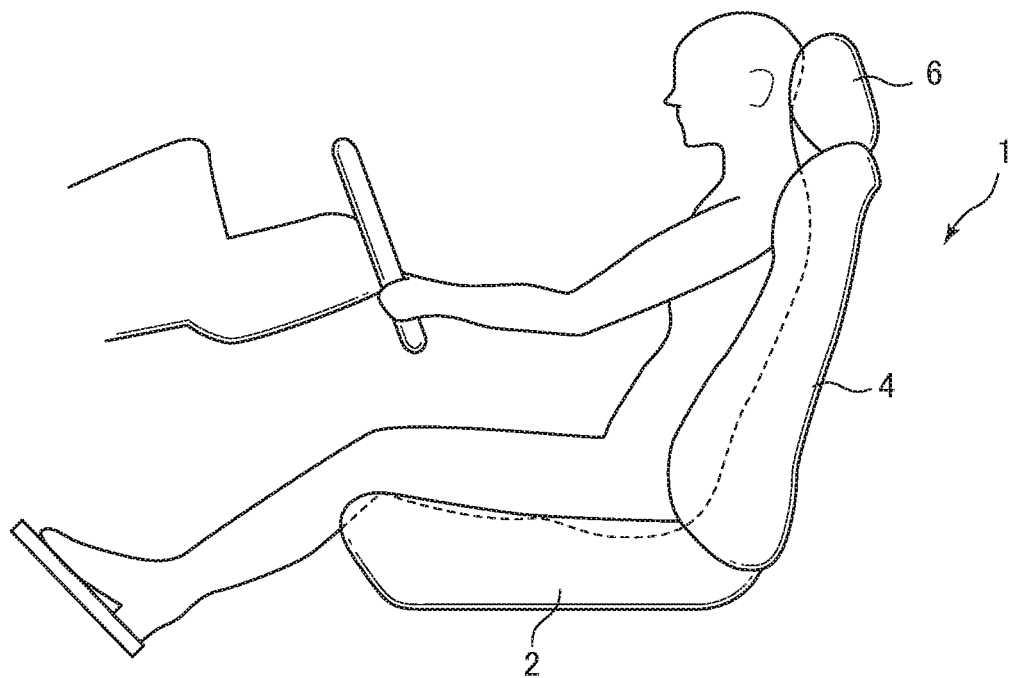
FIG. 1 is a schematic diagram showing the entirety of a vehicle seat according to one embodiment of the present invention.
Figure 2:
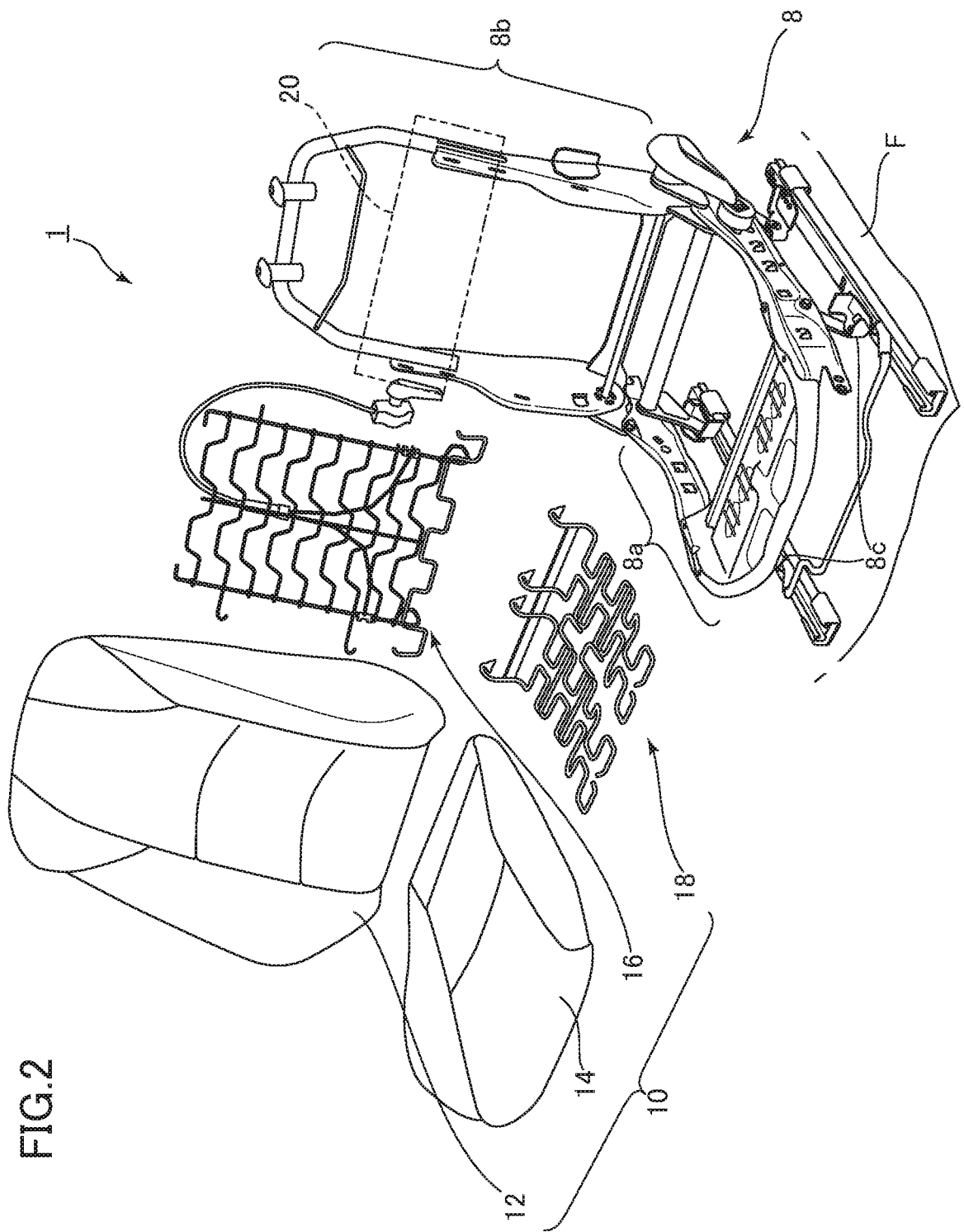
FIG. 2 is an exploded perspective view of the vehicle seat according to this embodiment.

FIG. 1 is a schematic diagram showing the entirety of the vehicle seat according to this embodiment. FIG. 2 is an exploded perspective view of the vehicle seat according to this embodiment.

As shown in FIG. 1, the vehicle seat 1 according to this embodiment comprises a seat cushion 2, a seat back 4, and a headrest 6. Each of the seat cushion 2, the seat back 4 and the headrest 6 comprises: a metal frame serving as a frame structure, and a cushioning member serving as a seating member, wherein the cushioning member formed of an elastic member, and urethane foam or the like disposed to wrap the frame and the elastic member. Here, the vehicle seat 1 in this embodiment is a driver seat for a vehicle. However, it should be understood that the present invention can also be applied to any vehicle seat other than the driver seat, such as a front passenger seat for a vehicle.

As shown in FIG. 2, the vehicle seat 1 according to this embodiment comprises a frame structure 8 made from metal and configured to be fixed to a vehicle floor F of a vehicle, and a seating member 10 supported by the frame structure 8 and configured to have a given elastic deformation property and a given vibration damping property and allow an occupant to be seated therein. That is, the seat cushion 2 and the seat back 4 are comprised of the frame structure 8 and the seating member 10. It should be noted here that the headrest 6 is omitted in FIG. 2.

The frame structure 8 is a frame constricted by combining a plurality of metal components. Specifically, the frame structure 8 comprises: a bottom frame portion 8a for giving structural strength mainly to the seat cushion 2 of the vehicle seat 1; a back frame portion 8b disposed to extend obliquely upwardly from a rear end of the bottom frame portion 8a to give structural strength mainly to the seat back 4 of the vehicle seat 1; and a leg mechanism portion 8c for coupling the bottom frame portion 8a to the vehicle floor F. The leg mechanism portion 8c attached to the bottom frame portion 8a is directly fixed to the vehicle floor F, i.e., a member for providing a cushioning property is not substantially provided between the leg mechanism portion 8c and the vehicle floor F.

The back frame portion 8b is comprised of a generally reverse U-shaped metal member curved convexedly upwardly. The bottom frame portion 8a is comprised of a generally U-shaped metal member curved convexedly toward a forward side of the vehicle seat 1. The back frame portion 8b and the bottom frame portion 8a are configured such that a lower end of the back frame portion 8b and a rear end of the bottom frame portion 8a are hinge-connected together in a rotatable manner. In this way, the back frame portion 8b is configured such that the angle thereof with respect to the bottom frame portion 8a can be changed so as to take reclining positions. The leg mechanism portion 8c is provided with a sliding mechanism for allowing the frame structure 8 to be slid with respect to the vehicle floor F, in a forward-rearward (longitudinal) direction of the vehicle. This sliding mechanism is configured to allow the vehicle seat 1 to be moved in the forward-rearward direction and locked at a position chosen by an occupant D. It should be noted here that, as used in this specification, the term "forward direction" of the vehicle seat 1 means a direction toward a side opposite to the seat back 4.

The seating member 10 comprises: a back cushioning member 12 and a bottom cushioning member 14 each made of urethane foam; a back elastic member 16 comprised of a plurality of metal wires fixed to the back frame portion 8b; and a bottom elastic member 18 comprised of a plurality of metal wires fixed to the bottom frame portion 8a. As above, the seat cushion 2 of the vehicle seat 1 is comprised of the bottom frame portion 8a of the frame structure 8, the bottom elastic member 18, and the bottom cushioning member 14, and the seat back 4 is comprised of the back frame portion 8b of the frame structure 8, the back elastic member 16, and the back cushioning member 12.

The back elastic member 16 is a metal spring composed of a plurality of metal wires arranged in a net-like pattern in a tensioned manner, and the outer periphery thereof is fixed to the back frame portion 8b. Thus, when an occupant D is seated in the vehicle seat 1, the metal wires composing the back elastic member 16 are elastically deformed to support the back of the occupant D. As can be understood from the above, the back elastic member 16 has an elastic deformation property but does not substantially have a vibration damping property.

The back cushioning member 12 is a member made from urethane foam and supported by the back frame portion 8b and the back elastic member 16, and is disposed to cover the back frame portion 8b and the back elastic member 16. The urethane foam composing the back cushioning member 12 includes a large number of cells or pores, and has a viscoelastic property. That is, the back cushioning member 12 has an elastic deformation property and further has a vibration damping property (damper property). Thus, when the occupant D is seated in the vehicle seat 1, the back cushioning member 12 is compressively deformed to support the occupant D in cooperation with the back elastic member 16. Then when the occupant D leaves the vehicle seat 1 or the load of the occupant D is reduced, the back cushioning member 12 which is compressively deformed will be slowly returned to its original shape.

The bottom elastic member 18 is a metal leaf spring composed of meandering-shaped metal thin plates whose front and rear ends are fixed to the bottom frame portion 8a. Thus, when the occupant D is seated in the vehicle seat 1, the metal leaf spring composing the bottom elastic member 18 is elastically deformed to support the hip of the occupant D. As can be understood from the above, the bottom elastic member 18 has an elastic deformation property but does not substantially have a vibration damping property.

The bottom cushioning member 14 is a member made from urethane foam and supported by the bottom frame portion 8a and the bottom elastic member 18, and is disposed to cover the bottom frame portion 8a and the bottom elastic member 18. The urethane foam composing the bottom cushioning member 14 includes a large number of cells or pores, and has a viscoelastic property. That is, the bottom cushioning member 14 has an elastic deformation property and further has a vibration damping property (damper property). Thus, when the occupant D is seated in the vehicle seat 1, the bottom cushioning member 14 is compressively deformed to support the occupant D in cooperation with the bottom elastic member 18. Then when the occupant D leaves the vehicle seat 1 or the load of the occupant D is reduced, the bottom cushioning member 14 which is compressively deformed will be slowly returned to its original shape.

Figure 3:
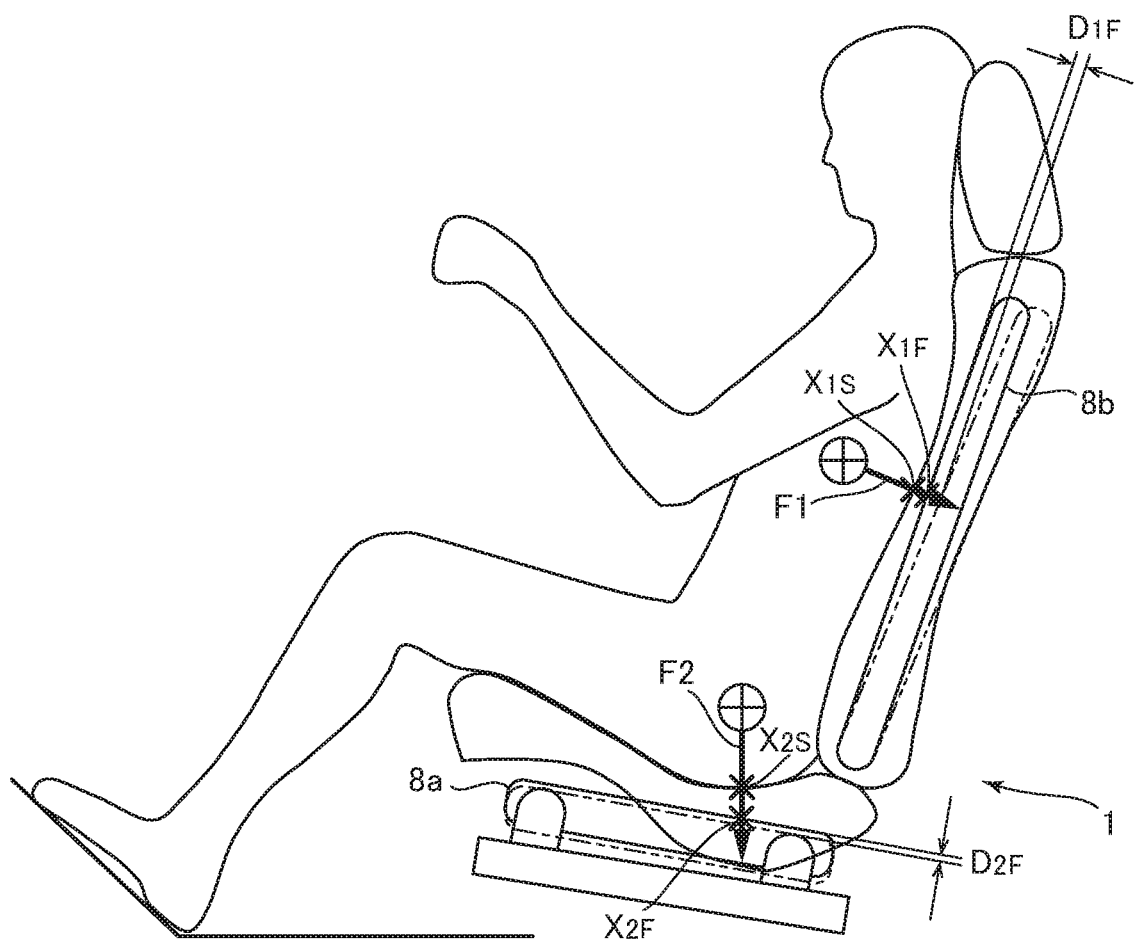
FIG. 3 is a diagram illustrating deformation and displacement in the vehicle seat according to this embodiment, in a situation where a load is applied thereto.
Figure 4:
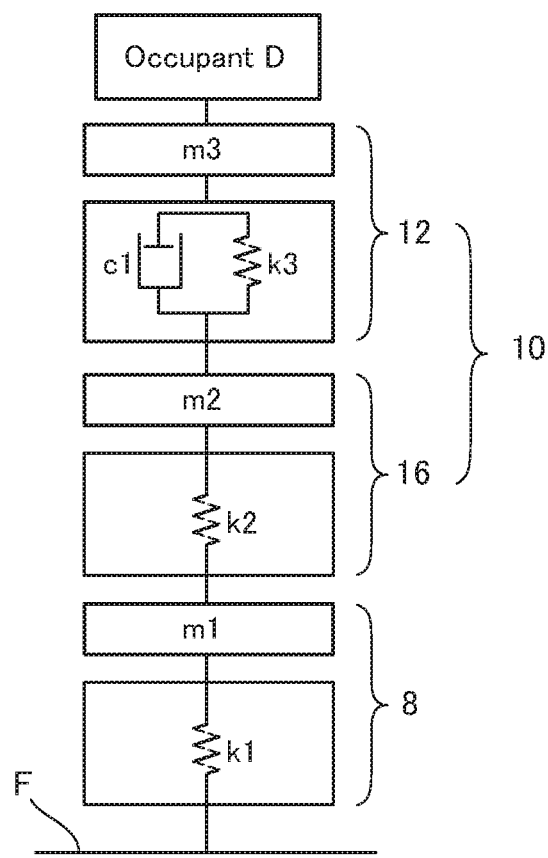
FIG. 4 shows a model expressing deformation and displacement in the vehicle seat according to this embodiment.

Next, with reference to FIGS. 3 and 4, deformation and displacement in the vehicle seat 1 according to this embodiment, in a situation where a load is applied thereto.

FIG. 3 is a diagram illustrating deformation and displacement in the vehicle seat 1 according to this embodiment, in a situation where a load is applied thereto. FIG. 4 shows a model expressing deformation and displacement in the vehicle seat 1 according to this embodiment.

As shown in FIG. 3, when the occupant D is seated in the vehicle seat 1, a load is applied to each of the seat cushion 2 and the seat back 4, so that each of the seat cushion 2 and the seat back 4 is deformed and displaced. With regard to the seat cushion 2, mainly the body weight of the occupant D is applied thereto, and, when the vehicle seat 1 vibrates in an upward-downward direction, an inertia force exerted to the occupant D is also applied thereto. With regard to the seat back 4, mainly a leaning force of the occupant D is applied thereto, and, when the vehicle is accelerated, an inertia force of the occupant D based on the acceleration is also applied thereto. Such a load applied onto each of the seat cushion 2 and the seat back 4 in a distributed manner can be handled on the assumption that it is applied at a center-of-gravity point of each of them in a concentrated manner.

Specifically, as shown in FIG. 3, a load applied to the seat back 4 can be handled on the assumption that a load F1 oriented in a direction orthogonal to the surface of the seat back 4 is applied at a load center point $X_{1S}$ in a concentrated manner. Further, a load applied to the seat cushion 2 can be handled on the assumption that a load F2 oriented vertically downwardly 4 is applied at a load center point $X_{2S}$ in a concentrated manner.

Thus, transmission of the force F1 applied to the vehicle seat 1, to the vehicle floor F, can be modeled as shown in FIG. 4. Specifically, the force F1 applied to the vehicle seat 1 is transmitted to the vehicle floor F, under serial actions of properties (a mass m3, a spring component k3 and a damper component c1) of the back cushioning member 12, properties (a mass m2 and a spring component k2) of the back elastic member 16, and properties (a mass m1 and a spring component k1) of the frame structure 8. Reversely, vibration of the vehicle floor F is transmitted to the occupant D through the properties of the back cushioning member 12, the properties of the back elastic member 16, and the properties of the frame structure 8. Similarly, the force F2 applied to the vehicle seat 1 is transmitted to the vehicle floor F, under serial actions of properties of the bottom cushioning member 14, properties of the bottom elastic member 18, and the properties of the frame structure 8.

Here, the present inventor has found that, when a spring property (elastic deformation property) of the seating member 10 and a spring property of the frame structure 8 satisfy a given relationship, it is possible to obtain good riding comfort as a target set when designing the seating member 10 and the frame structure 8 themselves. Specifically, when a spring constant of the frame structure 8 is 20 times or more a spring constant of the seating member 10, such good riding comfort can be obtained.

Firstly, when determining the spring constant of a portion of the seating member 10 in the seat back 4, the frame structure 8 (particularly, the back frame portion 8b) of the vehicle seat 1 is strongly fixed so as not to be displaced. In this state, a given load W is applied at the load center point $X_{1S}$ to cause the portion of (the back cushioning member 12 and the back elastic member 16) of the seating member 10 in the seat back 4 to be deformed. Here, the load center point $X_{1S}$ is a center of pressure to be exerted to the seat back 4 by the occupant D. Generally, it is approximately coincident with a point at which a center-of-gravity point of the thorax of the occupant D is projected on the seat back 4 in a direction orthogonal to the surface of the seat back 4. Typically, the center-of-gravity point of the thorax is located at a width directionally central position of the seat back 4, in plan view, and at a position vertically upwardly away from a hip supporting point on the seat cushion 2, by about 300 mm to about 500 mm, in side view.

In this embodiment, a displacement amount (sinking amount) [mm] of a disk having a diameter of 100 mm, occurring when the disk is placed onto the surface of the seat back 4 such that a center of the disk is coincident with the load center point $X_{1S}$ on the surface of the seat back 4 to apply a force of 100 [N] in a direction orthogonal to the surface of the seat back 4, was measured as a deformation amount $D_{1S}$ of the seating member 10 itself. That is, in this measurement, the frame structure 8 (back frame portion 8b) of the vehicle seat 1 is strongly fixed so as not to be displaced, so that the displacement amount can be deemed as a deformation amount of the back cushioning member 12 and the back elastic member 16 of the seating member 10. Further, the spring constant of the portion of the seating member 10 in the seat back 4 can be determined by dividing the applied load W (=100 [N]) by the deformation amount $D_{1S}$ [mm]. In this embodiment, this spring constant is set to about 3.3 [N/mm].

Then, the spring constant of a portion of the frame structure 8 in the seat back 4 is measured. Firstly, the seating member 10 is removed from the vehicle seat 1 to expose the frame structure 8, and this frame structure 8 is fixed to the vehicle floor F to which the vehicle seat 1 is to be installed. In this state, the load W is applied at a point $X_{1F}$ corresponding to the load center point $X_{1S}$, and a displacement of the point $X_{1F}$ is measured as a displacement amount $D_{1F}$ [mm] of the frame structure 8 itself. Here, the point $X_{1F}$ corresponding to the load center point $X_{1S}$ means a point at which the load center point $X_{1S}$ is projected on the frame structure 8 in a direction orthogonal to the surface of the seat back 4. In this embodiment, the portion of the frame structure 8 in the seat back 4 is comprised of the reverse U-shaped back frame portion 8b, so that there is no member at the position of point $X_{1F}$. Therefore, a member 20 (indicated by the two-dot chain line in FIG. 2) which can be deemed as a rigid body is disposed between two lateral legs of the back frame portion 8b, and the load W is applied to this member 20 in a direction orthogonal to the surface of the seat back 4. A displacement of the point $X_{1F}$ caused by applying the load W is measured as the displacement amount $D_{1F}$ [mm] of the frame structure 8. Further, the spring constant of the portion of the frame structure 8 in the seat back 4 can be determined by dividing the applied load W (=100 [N]) by the deformation amount $D_{1F}$ [mm]. In this embodiment, this spring constant is set to about 72 [N/mm].

Here, the displacement amount $D_{1F}$ of the frame structure 8 depends on strength of the back frame portion 8b itself to which the load is directly applied, respective strengths of the bottom frame portion 8a and the leg mechanism portion 8c, a displacement due to elastic deformation and small backlash in each connection section among these components, joining strength between the leg mechanism portion 8c and the vehicle floor F, and the like. Thus, in order to set the displacement amount $D_{1F}$ of the frame structure 8 to a proper value, it is necessary to adequately manage not only respective strengths of components composing the frame structure 8, but also all the aforementioned factors.

The present inventor has found that, when the deformation amount $D_{1S}$ of the seating member 10 itself and the displacement amount $D_{1F}$ of the frame structure 8 in the situation where the same load W is applied thereto satisfy the following relationship: $D_{1S}/D_{1F} \geq 20$, riding comfort of the vehicle seat 1 becomes good. In other words, when the spring constant (corresponding to k1 in FIG. 4) of the frame structure 8 is 20 times or more the spring constant (corresponding to a composite spring constant of k2 and k3 in FIG. 4) of the seating member 10, good riding comfort can be obtained. That is, as a result of setting the two spring constants in the above manner, rigidity of the frame structure 8 becomes sufficiently higher than that of the seating member 10, so that the occupant D seated in the vehicle seat 1 can realize a feeling of unity with the vehicle.

Further, when the rigidity of the frame structure 8 becomes sufficiently higher than that of the seating member 10, the seating member 10 becomes less likely to be influenced by deformation of the frame structure 8, so that the seating member 10 can bring out sufficient riding comfort performance conforming to design intent thereabout. In particular, the spring constant (ratio of the load W to the displacement amount $D_{1F}$) of the frame structure 8 may be set to 70 N/mm or more. In this case, the elastic deformation property and the vibration damping property of the seating member 10 itself can be sufficiently exerted without being largely influenced by a displacement of the frame structure 8. This makes it possible to easily construct a vehicle seat 1 capable of providing good riding comfort. For example, in a case where low rebound urethane foam (shape-memory urethane foam) is used in the seating member, it is possible to enhance an occupant holding capability during behavior of the vehicle.

Next, measurement of each spring constant in the seat cushion 2 will be described.

When determining a spring constant of a portion of the seating member 10 in the seat cushion 2, the frame structure 8 (particularly, the bottom frame portion 8a) of the vehicle seat 1 is strongly fixed so as not to be displaced. In this state, a given load W is applied at a load center point $X_{2S}$ to cause the portion of the seating member 10 (i.e. the bottom cushioning member 14 and the bottom elastic member 18) in the seat cushion 2 to be deformed. Here, the load center point $X_{2S}$ is a center of pressure to be exerted to the seat cushion 2 by the occupant D. Generally, it is approximately coincident with a point at which an ischial tuberosity point (exactly, a midpoint between respective contact points of the ischial tuberosities with respect to the seat cushion 2) of the occupant D is projected on the seat cushion 2 in a vertical direction. Typically, the ischial tuberosity point is located at a width directionally central position of the seat cushion 2, in plan view, and at a position horizontally forwardly away from a rear end of the seat cushion 2 by about 60 mm to about 150 mm, in side view.

In this embodiment, a displacement amount (sinking amount) [mm] of a disk having a diameter of 200 mm, occurring when the disk is placed onto the surface of the seat cushion 2 such that a center of the disk is coincident with the load center point $X_{2S}$ on the surface of the seat cushion 2 to apply a force of 100 [N] in a direction orthogonal to the surface of the seat cushion 2, was measured as a deformation amount $D_{as}$ of the seating member 10 itself. That is, in this measurement, the frame structure 8 (bottom frame portion 8a) of the vehicle seat 1 is strongly fixed so as not to be displaced, so that the displacement amount can be deemed as a deformation amount of the bottom cushioning member 14 and the bottom elastic member 18 of the seating member 10. Further, the spring constant of the portion of the seating member 10 in the seat cushion 2 can be determined by dividing the applied load W (=100 [N]) by the deformation amount $D_{2S}$ [mm].

Then, the spring constant of a portion of the frame structure 8 in the seat cushion 2 is measured. Firstly, the vehicle seat 1 is fixed to the vehicle floor F to which the vehicle seat 1 is to be installed, and the seating member 10 is removed from the vehicle seat 1 to expose the frame structure 8. In this state, the load W is applied at a point $X_{2F}$ corresponding to the load center point $X_{2S}$, and a displacement of the point $X_{2F}$ is measured as a displacement amount $D_{2F}$ [mm] of the frame structure 8 itself. Here, the point $X_{2F}$ corresponding to the load center point $X_{2S}$ means a point at which the load center point $X_{2S}$ is projected on the frame structure 8 vertically downwardly. In this embodiment, the portion of the frame structure 8 in the seat cushion 2 is comprised of the U-shaped bottom frame portion 8a, so that there is no member at the position of point $X_{2F}$. Therefore, a member (not shown) which can be deemed as a rigid body is disposed between two lateral legs of the bottom frame portion 8a, and the load W is applied to this member 20. A displacement of the point $X_{2F}$ caused by applying the load W is measured as the displacement amount $D_{2F}$ [mm] of the frame structure 8. Further, the spring constant of the portion of the frame structure 8 in the seat cushion 2 can be determined by dividing the applied load W (=100 [N]) by the deformation amount $D_{2F}$ [mm].

The present inventor has found that, when the deformation amount $D_{2S}$ of the seating member 10 itself and the displacement amount $D_{2F}$ of the frame structure 8 determined in the situation where the same load W is applied thereto, as mentioned above, satisfy the following relationship: $D_{2S}\ D_{2F} \geq 20$, riding comfort of the vehicle seat 1 becomes good. In other words, when the spring constant of the frame structure 8 is 20 times or more the spring constant of the seating member 10, good riding comfort can be obtained.

Next, with reference to FIG. 5, the function of the vehicle seat 1 according to this embodiment will be described.

Figure 5:
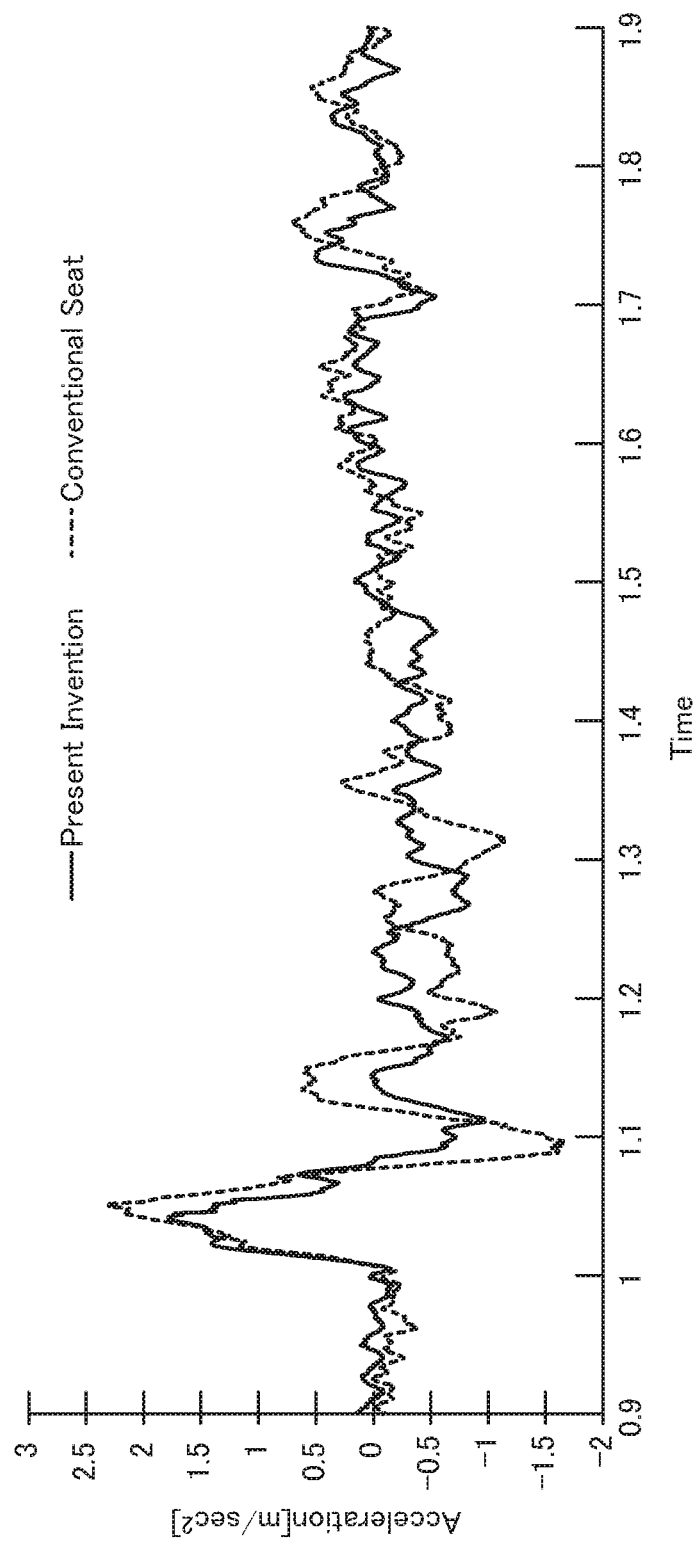
FIG. 5 is a chart showing a forward-rearward directional acceleration acting on a surface of a seat back during traveling of a vehicle equipped with a vehicle seat, in a comparative manner between the vehicle seat according to this embodiment and a conventional vehicle seat.

FIG. 5 is a chart showing a forward-rearward directional acceleration acting on a surface of a seat back during traveling of a vehicle equipped with a vehicle seat, in a comparative manner between the vehicle seat 1 according to this embodiment and a conventional vehicle seat. In FIG. 5, the forward-rearward directional acceleration occurring when a vehicle equipped with a vehicle seat passes over a bump at a speed of about 20 [km/h] is indicated by the solid line for the vehicle seat 1 according to this embodiment, and by the broken like for the conventional vehicle seat. Here, the conventional vehicle seat whose data is indicated by the broken line in FIG. 5 is different from the vehicle seat 1 according to this embodiment, in terms of the configuration of the frame structure, but is identical to the vehicle seat 1 according to this embodiment, in terms of the spring constant of the seating member.

As shown in FIG. 5, in the vehicle seat 1 according to this embodiment, both of a peak in acceleration at the time when front road wheels of the vehicle hit the bump, and a dip in acceleration at the time when the front road wheels pass over the bump are suppressed to lower values than those in the conventional seat. Further, in the vehicle seat 1 according to this embodiment, after the front road wheels pass over the bump, vibration converges more rapidly than the conventional seat. As typified by this measurement result, the vehicle seat 1 according to this embodiment is constructed to have better riding comfort performance than the conventional seat.

Next, with reference to FIG. 6, a design method for the vehicle seat 1 according to the above embodiment will be described.

Figure 6:
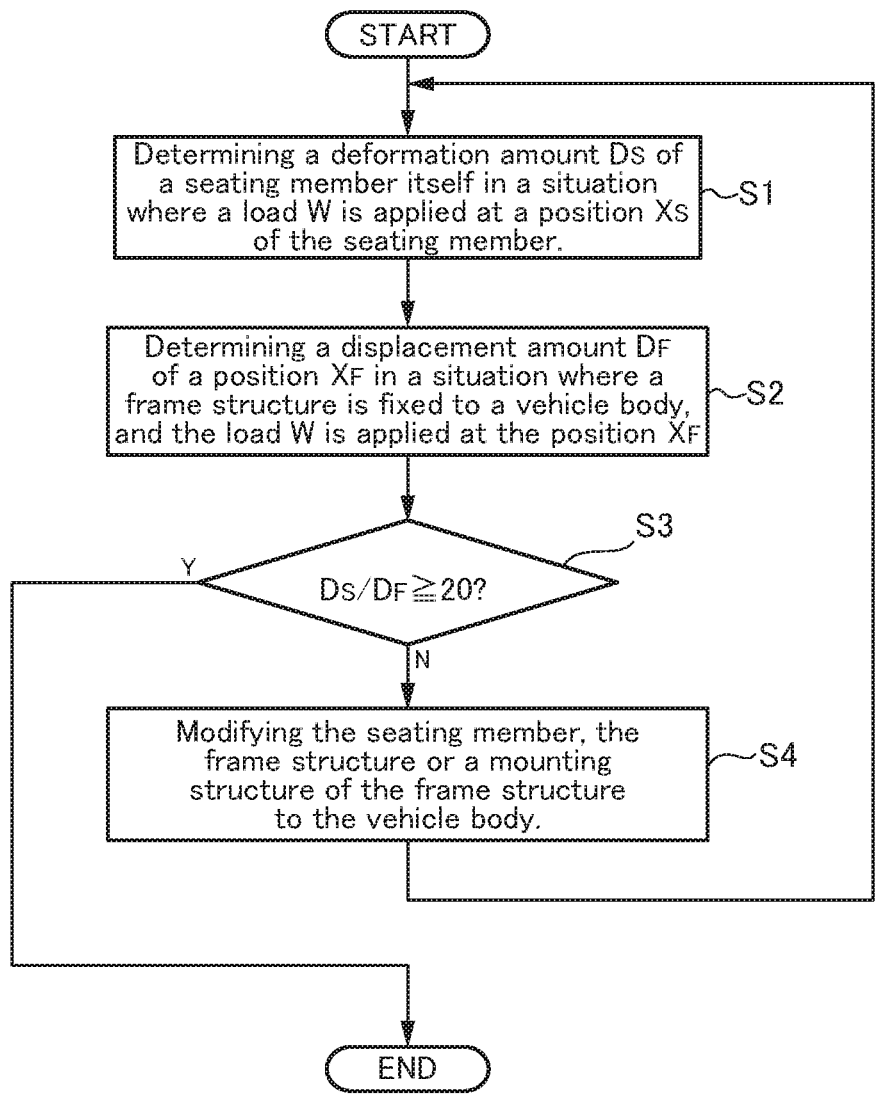
FIG. 6 is a flowchart showing steps of a design method for the vehicle seat according to this embodiment.

FIG. 6 is a flowchart showing steps of the design method for the vehicle seat 1 according to the above embodiment.

First of all, in step S1 in FIG. 6, the seating member 10 is designed, and a deformation amount $D_S$ of the designed seating member 10 itself in a situation where a given load W is applied at a given position $X_S$ (a given position on the seat cushion 2 or a given position on the seat back 4) of the designed seating member is determined. This deformation amount $D_S$ can be measured by experiment in the aforementioned manner. Alternatively, the deformation amount $D_S$ may be determined by calculation using a finite element method or the like, based on data about a material and structure of each part of the seating member 10 input into a computer (not shown).

Subsequently, in step S2, the frame structure 8 is designed, and a displacement amount $D_F$ of a position $X_F$ of the designed frame structure 8 corresponding to the position $X_S$, in a situation where the designed frame structure 8 is fixed to the vehicle body, and the load W is applied at the position $X_F$ is determined. This deformation amount $D_F$ can be measured by experiment in the aforementioned manner. Alternatively, the displacement amount $D_F$ may be determined by calculation using a finite element method or the like, based on data about a material and structure of each part of the frame structure 8 input into a computer (not shown).

Subsequently, in step S3, it is checked whether or not the deformation amount $D_S$ and the displacement amount $D_F$ satisfy the following relationship: $D_S/D_F \geq 20$. When they satisfy the above relationship, the design of the vehicle seat 1 is completed. On the other hand, when they do not satisfy the above relationship, the process will proceed to step S4.

In the step S4, the seating member 10, the frame structure 8, or a mounting structure of the frame structure 8 to the vehicle body is modified so as to satisfy the relationship: $D_S/D_F \geq 20$. Here, as a design change for reducing the displacement amount $D_F$, the following techniques are effective: providing a reinforcement brace in the back frame portion 8b and/or the bottom frame portion 8a of the frame structure 8; structurally changing the vehicle seat to reduce backlash in a reclining mechanism coupling the back frame portion 8b and the bottom frame portion 8a together; structurally changing the vehicle seat to increase strength of or reduce backlash in a sliding mechanism (not shown) with respect to the vehicle floor; or improving retaining strength of a lock mechanism of the sliding mechanism.

After carrying out the design change in the step S4, the process returns to the step S1 to re-determine the deformation amount $D_S$ of the seating member 10 and the displacement amount $D_F$ of the frame structure 8. Here, it is to be understood that, when the configuration of the seating member 10 is not modified, the step S1 may be skipped, and, when the configuration of the frame structure 8 is not modified, the step S2 may be skipped. In the above manner, the above process will be repeated until the relationship: $D_S/D_F \geq 20$. is satisfied, whereby it is possible to design a vehicle seat 1 capable of providing good riding comfort.

In the vehicle seat 1 according to the above embodiment, the deformation amount $D_S$ of the seating member 10 itself and the displacement amount $D_F$ in the state in which the frame structure 8 is fixed to the vehicle body satisfy the relationship: $D_S/D_F \geq 20$, so that a displacement between the entire vehicle seat 1 and the vehicle body during behavior such as vehicle acceleration or deceleration is reduced, thereby allowing a seated occupant D to more reliably realize a feeling of unity with the vehicle. Further, when the above relationship is satisfied between the deformation amount $D_S$ and the displacement amount $D_F$, a displacement (deformation) of the frame structure 8 becomes less likely to exert a negative influence on the elastic deformation property and the vibration damping property of the seating member 10 itself, so that it is possible to allow the seating member 10 to sufficiently bring out intended performance in a design phase to obtain good riding comfort.

In the vehicle seat 1 according to the above embodiment, the seating member 10 comprises a member made from urethane foam having a given elastic deformation property (corresponding to k3 in FIG. 4) and a given vibration damping property (corresponding to c1 in FIG. 4); and the back elastic member 16 and the bottom elastic member 18 each of which is a spring made from metal and having a given elastic deformation property (corresponding to k2 in FIG. 4). This makes it possible to easily control the elastic deformation property and the vibration damping property of the seating member 10, and easily obtain desired properties.

In the vehicle seat 1 according to the above embodiment, the frame structure 8 is formed such that the ratio ($W/D_{1F}$) of the load W to the displacement amount $D_{1F}$ at the position corresponding to the center-of-gravity position of the thorax of the occupant D is about 70 N/mm, so that it is possible to sufficiently bring out the elastic deformation property and the vibration damping property of the seating member 10 itself, at the center-of-gravity position of the thorax mainly supporting the upper body of the occupant, without being largely influenced by the displacement of the frame structure 8. This makes it possible to easily construct a vehicle seat capable of providing good riding comfort.

Although the present invention has been described based on one preferred embodiment thereof, it should be understood that various changes and modifications may be made in the embodiment. Particularly, in the above embodiment, the seating member is comprised of the cushioning member made from urethane foam, and the elastic member made from metal. Alternatively, the seating member may be formed using another single material or a combination of other different material.

LIST OF REFERENCE SIGNS

1: vehicle seat
2: seat cushion
4: seat back
6: headrest
8: frame structure
8a: bottom frame portion
8b: back frame portion
8c: leg mechanism portion
10: seating member
12: back cushioning member
14: bottom cushioning member
16: back elastic member
18: bottom elastic member
20: member

The invention claimed is:

1. A vehicle seat mountable to a vehicle body of a vehicle and comprising a seat cushion and a seat back, the vehicle seat comprising:
   a frame structure to be fixed to the vehicle body; and
   a seating member supported by the frame structure and configured to have a given elastic deformation property and a given vibration damping property and allow an occupant to be seated therein,
   wherein the vehicle seat satisfies the following relationship: $D_S/D_F \geq 20$, where $D_S$ denotes a deformation amount of the seating member itself in a situation where a given load W is applied at a given position $X_S$ of the seating member, and $D_F$ denotes a displacement amount of a position $X_F$ of the frame structure corresponding to the given position $X_S$, in a situation where the frame structure is fixed to the vehicle body, and the given load W is applied at the position $X_F$.

2. The vehicle seat according to claim 1, wherein the seating member comprises a member made from urethane foam and having a given elastic deformation property and a given vibration damping property, and a spring made from metal and having a given elastic deformation property.

3. The vehicle seat according to claim 1, wherein the position $X_F$ at which the load is applied to the frame structure is a position corresponding to a center-of-gravity position of the thorax of the seated occupant, and wherein the frame structure is formed such that a ratio ($W/D_F$) of the load W to the displacement amount $D_F$ in the situation where the load W is applied at the position $X_F$ is 70 N/mm or more.

4. A design method for a vehicle seat mountable to a vehicle body of a vehicle and comprising a seat cushion and a seat back, the vehicle seat comprising: a frame structure to be fixed to the vehicle body; and a seating member supported by the frame structure and configured to have a given elastic deformation property and a given vibration damping property and allow an occupant to be seated therein, the design method comprising the steps of:
   designing the seating member, and determining, by measurement or calculation, a deformation amount $D_S$ of the designed seating member itself in a situation where a given load W is applied at a given position $X_S$ of the designed seating member;

designing the frame structure, and determining, by measurement or calculation, a displacement amount $D_F$ of a position $X_F$ of the designed frame structure corresponding to the given position $X_S$, in a situation where the designed frame structure is fixed to the vehicle body, and the given load W is applied at the position $X_F$; and checking whether or not the deformation amount $D_S$ and the displacement amount $D_F$ satisfy the following relationship: $D_S/D_F \geq 20$, and, if not, modifying the seating member, the frame structure, and/or a mounting structure of the frame structure to the vehicle body, so as to satisfy the relationship: $D_S/D_F \geq 20$.

5. The vehicle seat according to claim 2, wherein the position $X_F$ at which the load is applied to the frame structure is a position corresponding to a center-of-gravity position of the thorax of the seated occupant, and wherein the frame structure is formed such that a ratio ($W/D_F$) of the load W to the displacement amount $D_F$ in the situation where the load W is applied at the position $X_F$ is 70 N/mm or more.

* * * * *